(12) United States Patent
Combes et al.

(10) Patent No.: US 10,062,122 B2
(45) Date of Patent: *Aug. 28, 2018

(54) AUDIT PERFORMANCE EVALUATION

(71) Applicant: Aon Global Operations Ltd (Singapore Branch), Singapore (SG)

(72) Inventors: Kevin Combes, Rancho Santa Margarita, CA (US); Paul Braun, Pasadena, CA (US); Larry Joe Galusha, Grosse Ile, MI (US)

(73) Assignee: Aon Global Operations Ltd (Singapore Branch), Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 15/827,544

(22) Filed: Nov. 30, 2017

(65) Prior Publication Data

US 2018/0082382 A1 Mar. 22, 2018

Related U.S. Application Data

(63) Continuation of application No. 15/641,593, filed on Jul. 5, 2017, which is a continuation of application No. 14/144,964, filed on Dec. 31, 2013, now Pat. No. 9,721,303.

(51) Int. Cl.
| | |
|---|---|
| *G06Q 40/00* | (2012.01) |
| *G06Q 40/08* | (2012.01) |
| *G06Q 10/06* | (2012.01) |
| *G06Q 10/10* | (2012.01) |

(52) U.S. Cl.
CPC ............ *G06Q 40/08* (2013.01); *G06Q 10/06* (2013.01); *G06Q 10/06393* (2013.01); *G06Q 10/10* (2013.01); *G06Q 40/00* (2013.01)

(58) Field of Classification Search
CPC ...................................... G06Q 40/08
See application file for complete search history.

(56) References Cited

U.S. PATENT DOCUMENTS

| | | | |
|---|---|---|---|
| 5,765,138 A | 6/1998 | Aycock et al. | |
| 8,005,709 B2 | 8/2011 | King et al. | |
| 2002/0042751 A1* | 4/2002 | Sarno | G06Q 30/0601 705/26.1 |
| 2003/0150908 A1* | 8/2003 | Pokorny | B23Q 35/12 235/375 |
| 2004/0186750 A1 | 9/2004 | Surbey et al. | |
| 2007/0173993 A1 | 7/2007 | Nielsen et al. | |

FOREIGN PATENT DOCUMENTS

KR 10-2004-0049467 12/2004

* cited by examiner

*Primary Examiner* — Scott S Trotter
(74) *Attorney, Agent, or Firm* — Gardella Grace P.A.

(57) ABSTRACT

Audit performance systems and methods can be used to provide objective assessment of the performance of claim administrators. Data from audits performed by one or more insurance broker consultants can be input into the audit performance system, and analyzed, to generate reports that compare the performance of a selected claim administrator to an industry standard level of performance or to one or more other claim administrators.

20 Claims, 9 Drawing Sheets

AUDIT PERFORMANCE EVALUATION

CROSS-REFERENCE TO RELATED APPLICATIONS

This application is a continuation of U.S. application Ser. No. 15/641,593 entitled "Audit Performance Evaluation" and filed Jul. 5, 2017, which is a continuation of U.S. application Ser. No. 14/144,964 entitled "Audit Performance Evaluation" and filed Dec. 31, 2013 (now U.S. Pat. No. 9,721,303). All above identified applications are hereby incorporated by reference in their entireties.

COPYRIGHT NOTICE AND AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

SUMMARY OF THE INVENTION

Insurance providers currently perform internal audits on the performance of their claims administration, which are inherently subjective and do not offer the depth of insight required to determine effective adherence to best practices, thus placing the burden back on the risk manager to evaluate performance. Audit performance evaluations of the present technology are an alternative that provides the risk manager with an unbiased evaluation of the claim administrator's performance by leveraging objective and specific measurable criteria.

BRIEF DESCRIPTION OF THE DRAWINGS

Specific examples have been chosen for purposes of illustration and description, and are shown in the accompanying drawings, forming a part of the specification.

DETAILED DESCRIPTION

Audit performance evaluations of the present technology are tools that can be used by risk managers, such as insurance carriers, to assess the performance of their claim administration as compared to the claim administration of other insurance carriers in the industry, as well as to facilitate the selection and management of claim administrators, which may result in lower claim costs. For example, audit performance evaluations of the present technology provide measurements relating to how a claim administrator is performing with respect to industry standards.

Figure 1:
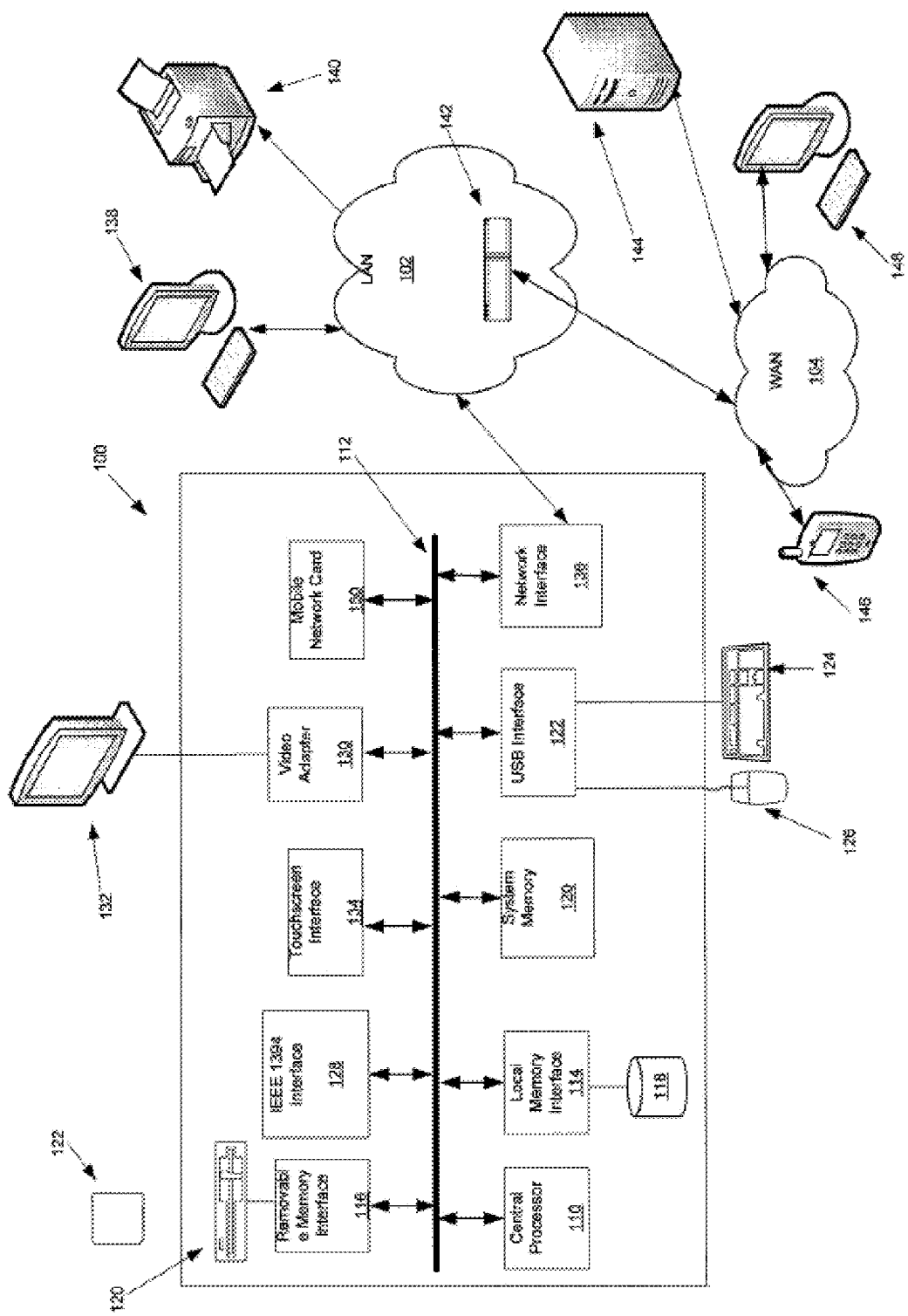
FIG. 1 illustrates one example of a computing device environment for an audit performance evaluation system of the present technology.

Various examples of the audit performance evaluation systems and methods of the present technology may be implemented with one or more computing devices, computing device networks and systems that evaluate the present information. Elements of an exemplary computing device system are illustrated in FIG. 1, in which the application of an audit performance evaluation is provided to a user, such as an insurance carrier. One or more computing devices 100 can be connected to a local area network (LAN) 102 and/or a wide area network (WAN) 104. Each computing device 100 can include a central processor 110 that controls the overall operation of the computing device, and a system bus 112 that connects central processor 110 to any one or more of the components described below. System bus 112 may be implemented with any one of a variety of conventional bus architectures.

Computing device 100 can include one or more of a variety of interface units and drives for reading and writing data or files. For example, computing device 100 can include any one or more of a local memory interface 114 and a removable memory interface 116, respectively coupling a hard disk drive 118 and a removable memory drive 120 to system bus 112. Examples of removable memory drives include magnetic disk drives, optical disk drives, and USB ports, that receive and operationally connect to removable memory elements 122, such as magnetic disks, optical disks, and USB drives. Hard disks generally include one or more read/write heads that convert bits to magnetic pulses when writing to a computing device-readable medium and magnetic pulses to bits when reading data from the computing device readable medium. A single hard disk drive 118 and a single removable memory drive 120 are shown for illustration purposes only and with the understanding that computing device 100 may include one or more of such drives. Furthermore, computing device 100 may include drives for interfacing with other types of computing device readable media such as magneto-optical drives.

Unlike hard disks, system memories, such as system memory 120, generally read and write data electronically and do not include read/write heads. System memory 120 may be implemented with a conventional system memory having a read only memory section that stores a basic input/output system (BIOS) and a random access memory (RAM) that stores other data and files.

A user can interact with computing device 100 with a variety of input devices, and through graphical user interfaces provided to the user by the computing device 100, such as though a browser application. For example, FIG. 1 shows a universal serial bus (USB) interface 122 coupling a keyboard 124 and a pointing device 126 to system bus 112. Pointing device 126 may be implemented with a hard-wired or wireless mouse, track ball, pen device, or similar device.

Computing device 100 may include additional interfaces for connecting peripheral devices to system bus 112. FIG. 1 shows a IEEE 1394 interface 128 that may be used to couple additional devices to computing device 100. Peripheral devices may include game pads scanners, printers, and other input and output devices and may be coupled to system bus 112 through parallel ports, game ports, PCI boards or any other interface used to couple peripheral devices to a computing device.

Computing device 100 may also include a video adapter 130 coupling a display device 132 to system bus 112. Display device 132 may include a cathode ray tube (CRT), liquid crystal display (LCD), field emission display (FED), plasma display or any other device that produces an image that is viewable by the user. A touchscreen interface 134 may be included to couple a touchscreen (not shown) to system buss 112. A touchscreen may overlay at least part of the display region of display device 132 and may be implemented with a conventional touchscreen technology, such as capacitive or resistive touchscreen technology.

One skilled in the art will appreciate that the device connections shown in FIG. 1 are for illustration purposes only and that several of the peripheral devices could be coupled to system bus 112 via alternative interfaces. For example, a video camera could be connected to IEEE 1394 interface 128 and pointing device 126 could be connected to another interface.

In some examples, computing device 100 can be connected to a LAN and/or a WAN. For example, a mobile network card 150 may be used to connect computing device 100 to LAN 102 and/or WAN 104 via the network interface 136. Mobile network card 150 may be configured to connect computing device 100 to LAN 102 and/or WAN 104 via a mobile telephone network in a conventional manner.

Computing device 100 may include a network interface 136 that couples system bus 112 to LAN 102. LAN 102 may have one or more of the well-known LAN topologies and may use a variety of different protocols, such as Ethernet. Computing device 100 may communicate with other computing devices and devices connected to LAN 102, such as computing device 138 and printer 140. Computing devices and other devices may be connected to LAN 102 via twisted pair wires, coaxial cable, fiber optics or other media. Alternatively, electromagnetic waves, such as radio frequency waves, may be used to connect one or more computing devices or devices to LAN 102.

A wide area network 104, such as the Internet, can also be accessed by computing device 100. FIG. 1 shows network interface 136 connected to LAN 102. LAN 102 may be used to connect to WAN 104. Alternatively, computing device 100 may be directly connected to WAN 104 by network interface 136. FIG. 1 shows a router 142 that may connect LAN 102 to WAN 104 in a conventional manner. A server 144, mobile terminal 146 and a computing device 148 are shown connected to WAN 104. Of course, numerous additional servers, computing devices, handheld devices, personal digital assistants, telephones and other devices may also be connected to WAN 104.

The operation of computing device 100 and server 144 may be controlled by computing device-executable instructions stored on a non-transitory computing device-readable medium. For example, computing device 100 may include computing device-executable instructions stored on a memory for transmitting information to server 144, receiving information from server 144 and displaying the received information on display device 132. Furthermore, server 144 may include stored on a memory computing device-executable instructions for, receiving requests from computing device 100, processing data and transmitting data to computing device 100. In some embodiments server 144 transmits hypertext markup language (HTML) and extensible markup language (XML) formatted data to computing device 100.

As noted above, the term "network" as used herein and depicted in the drawings should be broadly interpreted to include not only systems in which remote storage devices are coupled together via one or more communication paths, but also stand-alone devices that may be coupled, from time to time, to such systems that have storage capability. Consequently, the term "network" includes not only a "physical network" 102 and 104, but also a "content network," which is comprised of the data—attributable to a single entity—which resides across all physical networks.

Figure 2:
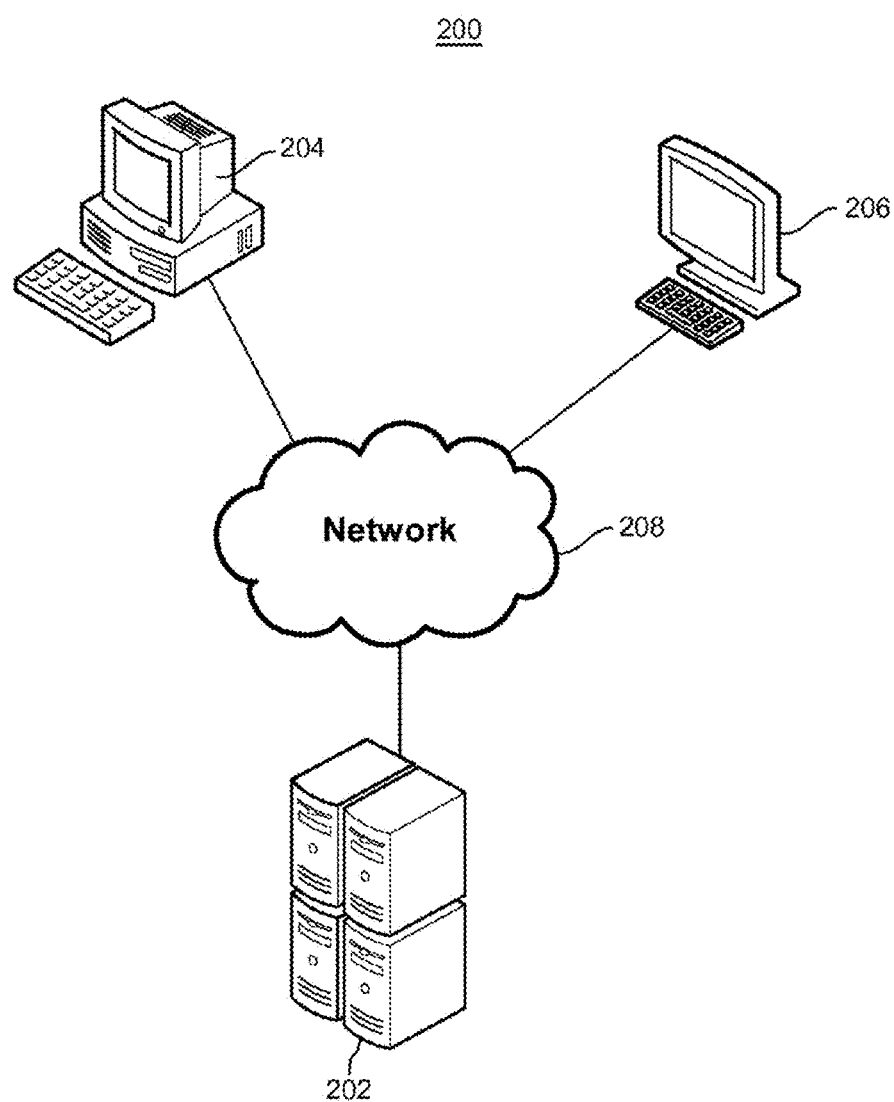
FIG. 2 illustrates one example of an audit performance evaluation system of the present technology.

FIG. 2 illustrates one example of a computing environment 200 supporting embodiments of an audit performance evaluation system. An audit evaluation provider computing device 202, which can be a plurality of computing devices, can communicate with one or more client computing devices 204 and one or more insurance broker consultant computing devices 206 over a network 208. The network 208 can be either a LAN, such as LAN 102 in FIG. 1, a WAN, such as WAN 104 in FIG. 1, or a combination of one or more LANs and WANs that are operatively connected. The audit evaluation provider computing device 202 can include separate data processing and storage computers as well as web servers (not individually depicted). Each of the audit evaluation provider computing device 202 and client computing devices 204, 206 can be a computing device 100 as shown in FIG. 1.

Accordingly, an audit performance evaluation systems of the present technology can include: at least one audit evaluation provider computing device 202, which can include a processor 110, a memory 118, 120, or 122, and a network interface 136; at least one audit evaluation provider computing device 202, which can include a processor 110, a memory 118, 120, or 122, and a network interface 136; and at least one client computing device 204, which can include a processor 110, a memory 118, 120, or 122, and a network interface 136. At least the client computing device 204 can also can include a display device 132. At least the audit evaluation provider computing device 202 and the client computing device 204 can include a keyboard 124 and a pointing device 126.

Audit performance evaluation systems of the present technology can include data repositories that include claim data and claim audit performance data for each of a plurality of claim audits performed on behalf of at least one insurance carrier. For example, claim administrators, also known as claim service providers, handle the processing of insurance claims for insurance carriers. Each insurance carrier may use the services of one or more claim administrators.

One or more insurance broker consultants can perform a claim audit on each of a plurality of claims handled by at least one claim administrator for at least one insurance carrier, in order to assess the performance of the at least one claim administrator. The one or more insurance broker consultants can input the claim data and claim audit performance data for each claim audit into an audit performance evaluation system. The claim data and claim audit performance data can be input through any suitable manual or automated process.

Accordingly, an audit performance evaluation system can receive claim data and claim audit performance data that is input into the audit performance evaluation system by one or more insurance broker consultants. In one example, with reference to FIG. 2, the one or more insurance broker consultants can enter the claim data and claim audit performance data at one or more broker consultant computing devices 206, and an audit evaluation provider computing device 202 can receive the claim data and claim audit performance data from the one or more insurance broker consultant computing devices 206 through network 208.

The received claim data and claim audit performance data can be stored in a non-transitory computing device readable medium of an audit performance evaluation system, such as a memory. For example, with reference to FIGS. 1 and 2, the audit evaluation provider computing device 202 can store the received claim data and claim audit performance data in a memory, such as hard disk drive 118, system memory 120, or removable memory 122.

Claim data can include claim identification information, which can be used for indexing audit performance data associated with each claim audit received by the audit performance evaluation system. For example, claim data can include at least one of the following identifiers: carrier name, claim administrator name, industry, claim type, monetary amount of claim, and combinations thereof.

Claim audit performance data can include performance scores for each of a plurality of performance categories, and, in some examples, for each of a plurality of criteria within a performance category. A performance score can be a numerical value assigned to a selected claim administrator based on the claim administrator's performance in a performance category, or a criteria within a performance category, for a given claim.

For example, claim audit performance data can include a performance score for each criterion within a category and the relative scores can be defined when the system is initially calibrated. The claim audit performance data can also include a cumulative performance score for each category, or, in the alternative, a computing device of the audit performance evaluation can calculate a cumulative performance score for each category by adding the performance scores for each of the criteria within a category.

Performance categories can be selected for use in an audit performance evaluation based on stages of claim processing. In some examples, performance categories can include any combination of: 1) initial contact and investigation, 2) operational issues, 3) case management/documentation, 4) medical management, 5) negotiation/litigation management, and 6) reserves. In one example of the industry of casualty insurance, the audit performance data can include performance measurements in all six of the plurality of these performance categories.

Criteria within each performance category can be selected based on elements of claim processing that must be performed during each stage that has been selected as a performance category. Some exemplary criteria for each of the performance categories listed above are provided below with respect to the industry of casualty insurance.

Under the performance category of "initial contact and investigation," exemplary criteria can include one or more of:
Completion of the three-point contact
Three-point contact follow up
Thorough and appropriate investigation completed within 30 days
Utilization of recorded statements
Correct decision made on coverage/compensability
Subrogation/employer liability (EL)/fraud issues have been identified and explored
Claim indexed and documented Performance scores for each criterion can be calibrated in various ways. For example, "Completion of the three-point contact criterion" may be scored as follows:
4 points=completion of three-point contact within 24 hours
3 points=completion of three-point contact within 72 hours
2 points=completion of three-point contact within 5 days
1 point=completion of three-point contact within more than 5 days
0 points=three-point contact not done An example of a set of performance scores for the "three-point contact follow up" criterion includes:
4 points=proper follow up with all three parties
3 points=proper follow up with two of three parties
2 points=proper follow up with one of three parties
1 point=improper follow up with all three parties
0 points=no follow up with any party An example of a set of performance scores for the "thorough and appropriate investigation completed within 30 day" criterion includes:
4 points=investigation completed that addresses all issues
3 points=investigation completed but follow up is necessary
2 points=investigation is incomplete and follow up is necessary
1 point=investigation is incomplete and there is no follow up
0 points=investigation is not done An example of a set of performance scores for the "utilization of recorded statements" criterion includes:
4 points=recorded statement thorough and required
3 points=recorded statement thorough but not required
2 points=recorded statement not thorough but not required
1 point=recorded statement not thorough and required
0 points=recorded statement not utilized and required An example of a set of performance scores for the "correct decision made on coverage/compensability" criterion includes:
4 points=coverage confirmed and documented
3 points=coverage confirmed and partially documented
2 points=coverage confirmed but not documented
1 point=coverage not confirmed
0 points=coverage incorrect An example of a set of performance scores for the "subrogation/EL/Fraud issues have been identified and explored" criterion includes:
4 points=issue identified and investigated
3 points=issue identified and partially investigated
2 points=issue identified but not investigated
1 point=issue not identified
0 points=no investigation An example of a set of performance scores for the "claim indexed and documented" criterion includes:
4 points=issue identified and investigated
3 points=issue identified and partially investigated
2 points=issue identified but not investigated
1 point=issue not identified
0 points=no investigation Under the performance category of "operational issues," exemplary criteria can include one or more of:
1st indemnity payment timely; forms timely & accurate
Subsequent benefits provided timely
Timely acceptance and/or denial
Wage statement obtained and calculated, if necessary Communication with client staff completed per instructions including surveillances requests, subrogation pursuit, etc.

Monetary penalties assessed, documented, and paid

MMSEA Identification & Compliance (including Medicate Set-Aside)

Performance scores for each criterion under the performance category of "operational issues," can be set in various ways. For example, "1$^{st}$ indemnity payment timely; forms timely & accurate" may be scored as follows:
- 4 points=indemnity paid accurately, timely, and with correct forms
- 3 points=indemnity paid accurately, timely, and with late forms
- 2 points=indemnity paid inaccurately with forms
- 1 point=indemnity paid late
- 0 points=indemnity not paid An example of a set of performance scores for the "subsequent benefits provided timely" criterion includes:
- 4 points=all payments timely with correct forms
- 3 points=all payments timely with incorrect forms
- 2 points=payments late with correct forms
- 1 point=payments late with incorrect forms
- 0 points=no payments An example of a set of performance scores for the "timely acceptance and/or denial" criterion (within a predetermined amount of time) includes:
- 4 points=decision timely and well documented
- 3 points=decision timely and poorly documented
- 2 points=decision late and well documented
- 1 point=decision late and poorly documented
- 0 points=no decision An example of a set of performance scores for the "wage statement obtained and calculated, if necessary" criterion includes:
- 4 points=request timely, calculation acceptable, and rate adjusted
- 3 points=request timely, calculation acceptable, and late adjustment
- 2 points=request untimely and incorrect adjustment
- 1 point=request untimely and no adjustment
- 0 points=no request made An example of a set of performance scores for the "communication with client staff completed per instructions" criterion includes:
- 4 points=all applicable communication instructions adhered to
- 3 points=90% plus adhered to
- 2 points=50% to 90% adhered to
- 1 point=10% to 50% adhered to
- 0 points=less than 10% adhered to An example of a set of performance scores for the "monetary penalties assessed, documented, and paid" criterion includes:
- 4 points=no administrative penalties
- 3 points=1 penalty, documented, and paid
- 2 points=2 penalties, not documented, and paid
- 1 point=2 penalties, documented, and not timely paid
- 0 points=unpaid, undocumented, and penalties Under the performance category of "case management/documentation," exemplary criteria can include one or more of:
Effective utilization of Plan of Action (POA)
File activities properly documented
Adequate and prompt supervisory oversight
Adjuster used a diary system to manage the case Performance scores for each criterion under the performance category of "case management/documentation," can be set in various ways. For example, "effective utilization of plan of action" may be scored as follows:
- 4 points=plan of action in less than five days, updated in 90 days, and applied consistently
- 3 points=plan of action in more than five days, updated in 90 days, and applied consistently
- 2 points=plan of action in more than five days, not updated, and applied inconsistently
- 1 point=plan of action in more than five days, not updated, and not applied consistently
- 0 points=no plan of action An example of a set of performance scores for the "plan of action updated when case facts change" criterion includes:
- 4 points=plan of action updated in less than five days after change
- 3 points=plan of action updated in five to ten days after change
- 2 points=plan of action updated in 10 to 20 days after change
- 1 point=plan of action updated in more than 20 days after change
- 0 points=no update An example of a set of performance scores for the "adequate and prompt supervisory oversight" criterion includes:
- 4 points=thorough supervision less than 10 days
- 3 points=thorough supervision more than 10 days
- 2 points=cursory supervision less than 10 days
- 1 point=cursory supervision more than 10 days
- 0 points=no supervision Under the performance category of "medical management," exemplary criteria can include one or more of:
Nurse referral indicated; referral timely.
Target date for return to work (RTW) identified
Employer contacted for restriction accommodation
Issues of medical causation clarified
Need for second opinion acted upon timely
Appropriate cover letters have been sent—Consultations
File includes proper medical documentation
Includes evidence on appropriate use of utilization review (UR)
Includes evidence of use of medical cost containment services such a Medical Bill Review Performance scores for each criterion under the performance category of "medical management," can be set in various ways. For example, "nurse referral indicated; referral timely" may be scored as follows:
- 4 points=need recognized; referral timely
- 3 points=need recognized; referral late
- 2 points=need recognized late; referral timely
- 1 point=need recognized late; referral late
- 0 points=need not recognized An example of a set of performance scores for the "request for referral to nurse case manager (NCM) assignment sent to client" criterion includes:
- 4 points=need for referral authorization recognized/referral timely
- 3 points=need for referral authorization recognized; referral untimely
- 2 points=need for referral authorization recognized late; referral timely
- 1 point=need for referral authorization recognized late; referral late
- 0 points=need not recognize An example of a set of performance scores for the "target date for RTW identified" criterion includes:
   4 points=RTW date/mod-duty (m-d) fully explored
   3 points=RTW date/m-d not explored
   2 points=RTW date not specific/m-d explored
   1 point=RTW date not specific/m-d unexplored
   0 points=no RTW efforts An example of a set of performance scores for the "employer (client) contacted for restriction accommodation" criterion includes:
   4 points=contacted at each change in restrictions
   3 points=contacted late at each change in restrictions
   2 points=contacted occasionally
   1 point=contacted rarely
   0 points=no contact at all An example of a set of performance scores for the "issues of medical causation clarified" criterion includes:
   4 points=causation issued recognized and clarified
   3 points=recognized late and clarified
   2 points=recognized late and clarified late
   1 point=recognized late and not clarified
   0 points=not recognized/not clarified An example of a set of performance scores for the "need for second opinion acted upon timely" criterion includes:
   4 points=need recognized and referral timely
   3 points=need recognized but referral late
   2 points=need recognized late and referral timely
   1 point=recognized late and referral late
   0 points=need not recognized An example of a set of performance scores for the "appropriate cover letters sent—consulations" criterion includes:
   4 points=timely/claim and issue specific
   3 points=timely/claim or issues specific
   2 points=untimely/claim and issue specific
   1 point=untimely/non-specific
   0 points=no cover used An example of a set of performance scores for the "is there proper medical documentation in the file" criterion includes:
   4 points=all reports in file/documented
   3 points=all reports in file/undocumented
   2 points=some reports in file/documented
   1 point=numerous missing reports
   0 points=no reports An example of a set of performance scores for the "is there evidence of appropriate use of UR" criterion includes:
   4 points=clear effort to use UR
   3 points=frequent effort to use UR
   2 points=occasional effort to use UR
   1 point=rare effort to use UR
   0 points=no effort to use UR An example of a set of performance scores for the "evidence of use of medical cost containment services" criterion includes:
   4 points=clear effort to use cost containment services
   3 points=frequent effort to use cost containment services
   2 points=occasional effort to use cost containment services
   1 point=rare effort to use cost containment services
   0 points=no effort to use cost containment services Under the performance category of "negotiation/litigation management," exemplary criteria can include one or more of:
   Client contacted prior to referral
   File referred to designated counsel at an appropriate time
   There is a claim/legal partnership on strategy
   Settlement values properly evaluated
   Negotiations pursued aggressively
   Settlement discussed with client An example of a set of performance scores for the "client contacted prior to referral" criterion includes:
   4 points=need for referral authorization recognized and referral timely
   3 points=need for referral authorization recognized but referral untimely
   2 points=need for referral authorization recognized late and referral timely
   1 point=need for referral authorization recognized late and referral late
   0 points=need not recognized An example of a set of performance scores for the "file referred to designated counsel at an appropriate time" criterion includes:
   4 points=need recognized and referral timely
   3 points=need recognized but referral late
   2 points=need recognized late and referral timely
   1 point=need recognized late and referral late
   0 points=need not recognized An example of a set of performance scores for the "litigation budget established" criterion includes:
   4 points=budget established and documented in claim record and claim managed within budget
   3 points=budget established late and claim managed within budget
   2 points=budget established and claim not managed within budget
   1 point=budget established late and claim managed within budget
   0 points=no budget established An example of a set of performance scores for the "settlement values properly evaluated" criterion includes:
   4 points=evaluation complete and timely
   3 points=evaluation complete and untimely
   2 points=evaluation incomplete and timely
   1 point=evaluation incomplete and untimely
   0 points=no evaluation An example of a set of performance scores for the "negotiations pursued aggressively" criterion includes:
   4 points=proactive/strategy documented
   3 points=proactive/strategy undocumented
   2 points=reactive/strategy documented
   1 point=reactive/strategy undocumented
   0 points=no efforts noted An example of a set of performance scores for the "settlement discussed with client" criterion includes:
   4 points=discussed/ER approved
   3 points=discussed/no ER approval
   2 points=attempted or intended/no ER approval
   1 point=discussed after-the fact
   0 points=no discussion noted Under the performance category of "reserves," exemplary criteria can include one or more of:
   Current reserve accurate and timely
   Initial reserve established timely
   Subsequent reserve changes were timely
   Reserve change form is completed and approved by management Performance scores for each criterion under the performance category of "reserves," can be set in various ways. For example, "current reserve accurate and timely" may be scored as follows:
   4 points=reflect probable outcome/timely
   3 points=reflect probable outcome/untimely 2 points=ind or med reserves inadequate
1 point=ind and med reserves inadequate
0 points=file active—no reserve An example of a set of performance scores for the "timely initial reserves established" criterion includes:
  4 points=initial reserves less than 5 days
  3 points=initial reserves 5-14 days
  2 points=initial reserves 14-30 days
  1 point=initial reserves greater than 30 days
  0 points=file active—reserve not established An example of a set of performance scores for the "subsequent changes of $15,000 or more communicated with client" criterion includes:
  4 points=accurate reserve change (ARC) less than 30 days from change event
  3 points=ARC 30-60 days from change event
  2 points=ARC greater than 60 days from change event
  1 point=inaccurate change less than 30 days from change event
  0 points=no change post event An example of a set of performance scores for the "client reserve worksheet utilized" criterion includes:
  4 points=accurate reserve worksheet less than 30 days from change event
  3 points=accurate reserve worksheet 30-60 days from change event
  2 points=accurate reserve worksheet greater than 60 days from change event
  1 point=inaccurate accurate reserve worksheet less than 30 days from change event
  0 points=no reserve worksheet utilized An example of a set of performance scores for the "excess carrier notified if reserved reach 50% of deductible" criterion includes:
  4 points=accurate and timely notification (less than 30 days) with claim notation
  3 points=accurate with notification (30-60 days from reserve entry) with claim notation
  2 points=accurate with notification (60-90 days from reserve entry) with claim notation
  1 point=accurate with notification (more than 90 days from reserve entry) with claim notation
  0 points=notification not sent Audit performance evaluation systems of the present technology can aggregate stored claim data and claim audit performance data, so that the aggregated data can be analyzed and one or more benchmark analyses can be generated that compare the performance of an identified claim administrator compared to one or more other claim administrators. For example, an audit evaluation provider computing device 202 can perform a step of aggregating stored claim data and claim audit performance data by grouping and indexing the stored claim data and claim audit performance data according to one or more factors, which can be elements of the claim data, including for example, insurance carrier, claim administrator, client engagement, and industry market segment.

An audit evaluation provider computing device 202 can analyze the aggregated claim data and claim audit performance data with respect to at least one claim administrator, or with respect to a plurality of claim administrators.

With respect to analyzing the criteria for at least one claim administrator, the analysis can include determining a cumulative performance score for each criterion, such as by adding or averaging all of the performance scores for each criterion that are associated with the claim administrator in the stored claim data and claim audit performance data. The analysis can also include determining a cumulative possible score for each criterion, which can represent a total score that the at least one claim administrator could obtain if it received the highest possible performance score for each criterion associated with the claim administrator in the stored claim data and claim audit performance data. Additionally, the analysis can include determining a percentage performance score for each criterion, by dividing the cumulative performance score for each criterion by the cumulative possible score for each criterion. The analysis can further include assigning a performance rating indicator for each criterion, which can provide a general indication of the level of performance of the at least one claim administrator with respect to each criterion. In some examples, the rating indicator may be one of a set of descriptive terms (e.g., strong/weak, high/medium/low, good/fair/poor), or one of a set of descriptive icons (e.g., thumbs up/thumbs down, smiley face/neutral face/sad face), or one of a set of descriptive colors (e.g., red/yellow/green). The scoring scales identified for each audit question are intended only to be guidelines for the auditor. Scoring actual performance is ultimately up to each auditor based upon the case facts known at the time of the audit and consistent with calibration activity done in advance of each audit. The scoring provides examples of questions that might be customized for a client and that ensures consistency between auditors. The statistical threshold to ensure that a sample size is representative is 95% confidence level with a 10% margin of error, in one embodiment.

With respect to the performance categories for at least one claim administrator, the analysis can also include determining a cumulative performance score for each performance category, such as by adding or averaging all of the cumulative performance scores for each criteria within each category. The analysis can also include determining a cumulative possible score for each performance category, which can represent a total score that the at least one claim administrator could obtain if it received the highest possible performance score for each performance category. Additionally, the analysis can include determining a percentage performance score for each performance category, by dividing the cumulative performance score for each performance category by the cumulative possible score for each performance category. The analysis can further include assigning a performance rating indicator for each performance category, which can provide a general indication of the level of performance of the at least one claim administrator with respect to each performance category. In some examples, the rating indicator may be one of a set of descriptive terms (e.g., strong/weak, high/medium/low, good/fair/poor), or one of a set of descriptive icons (e.g., thumbs up/thumbs down, smiley face/neutral face/sad face), or one of a set of descriptive colors (e.g., red/yellow/green).

The analysis can further include determining an overall cumulative performance score for at least one claim administrator, such as by adding or averaging all of the cumulative performance scores for each performance criteria. The analysis can also include determining an overall cumulative possible score, which can represent a total score that the at least one claim administrator could obtain if it received the highest possible performance scores in all of the performance categories. Additionally, the analysis can include determining an overall percentage performance score, by dividing the overall cumulative performance score by the overall cumulative possible score. The analysis can further include assigning an overall performance rating indicator, which can provide a general indication of the overall level of performance of the at least one claim administrator. In some examples, the rating indicator may be one of a set of descriptive terms (e.g., strong/weak, high/medium/low, good/fair/poor), or one of a set of descriptive icons (e.g., thumbs up/thumbs down, smiley face/neutral face/sad face), or one of a set of descriptive colors (e.g., red/yellow/green).

The analysis can also include determining an industry standard level of performance. The industry standard level of performance can be determined for each criteria, performance category, and as an overall cumulative industry standard level of performance. With respect to each criteria, one example of determining an industry standard level of performance can be to determine an average performance score for each criteria based on the performance scores for each category of all of the claim administrators identified in the claim data and audit performance data. With respect to each performance category, one example of determining an industry standard level of performance can be to determine an average performance score for each performance category based on the performance scores for each performance category of all of the claim administrators identified in the claim data and audit performance data. With respect to an overall cumulative industry standard level of performance, one example of an overall cumulative industry standard level of performance can be to determine an average overall cumulative performance score based on the overall cumulative performance scores of all of the claim administrators identified in the claim data and audit performance data. Each of the performance rating indicators discussed above can be designated based on whether a claim administrator exceeds a given industry standard level of performance, meets or comes within an acceptable range of a given industry standard level of performance, or falls below a given industry standard level of performance.

After the aggregated data is analyzed, an audit evaluation provider computing device 202 can generate one or more reports assessing the performance of a selected claim administrator. The assessment can include comparing the performance of the selected claim administrator to an industry standard level of performance. Alternatively, or additionally, the assessment can include comparing the performance of one or more other claim administrators. The reports can be in any suitable electronic form or hard copy. The reports can include visual display arrangements that include at least one of a tabular or a graphic depiction of a comparison of the performance of a selected claim administrator to the performance of one or more other claim administrators. In one example, an audit evaluation provider computing device 202 can transmit a report electronically to a client computing devices 204, and the visual display arrangement can be displayed on a graphical user interface of the client computing device 204.

Figure 3:
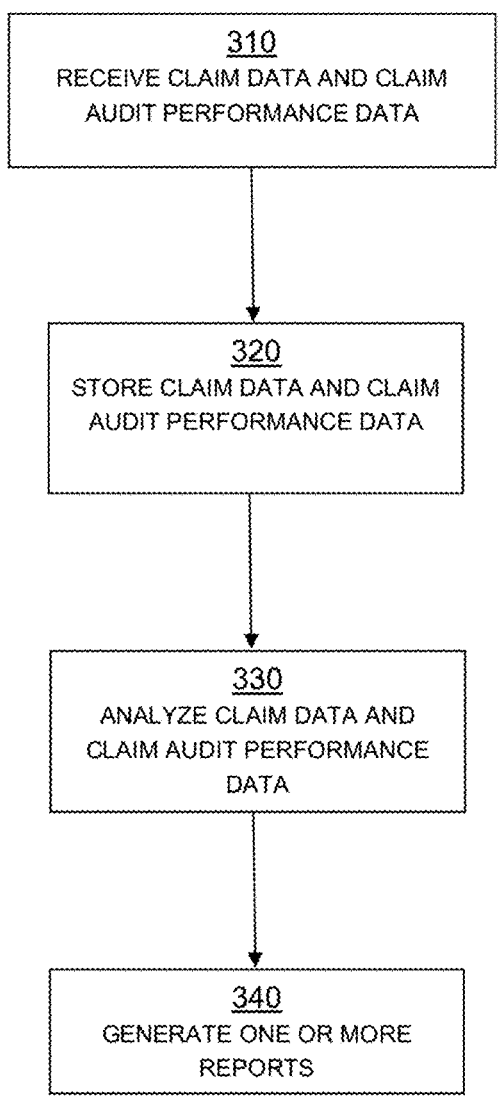
FIG. 3 illustrates a flow chart for a method of performing an audit performance evaluation of the present technology.

FIG. 3 illustrates a flow diagram for one method of performing an audit performance analysis using an audit performance evaluation system of the presented technology. In accordance with the method, an audit evaluation provider computing device 202 can receive claim data and claim audit performance data at box 310. At box 320, the audit evaluation provider computing device 202 can store the received claim data and claim audit performance data in a memory of the audit performance evaluation system, which can be any memory operatively connected to the audit evaluation provider computing device 202. The audit evaluation provider computing device 202 can then analyze the stored claim data and claim audit performance data at box 330. Finally, at box 340, the audit evaluation provider computing device 202 can generate one or more reports assessing the performance of a selected claim administrator.

FIGS. 4-7 illustrate examples of reports that can be generated by an audit evaluation provider computing device 202.

Figure 4:
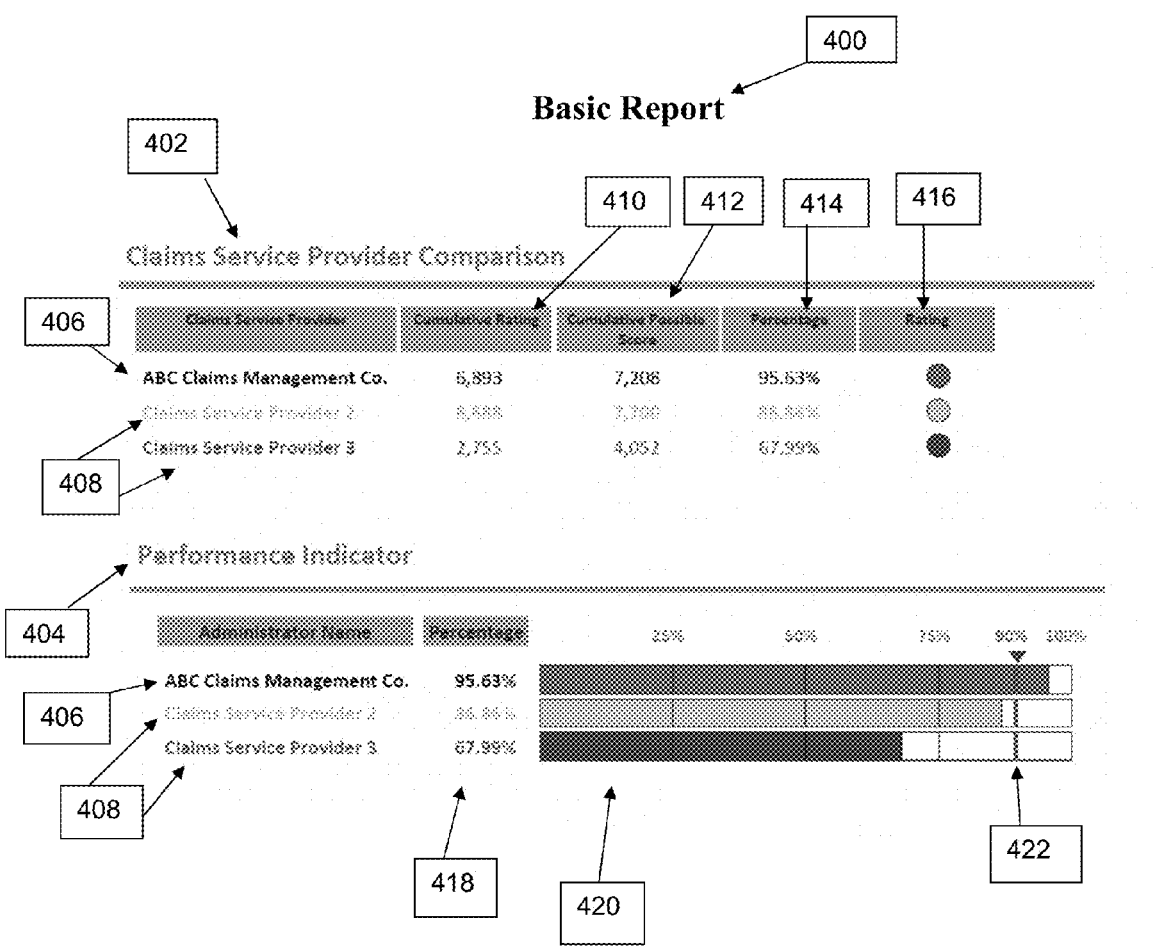
FIG. 4 illustrates one example of a basic report that can be generated using an audit performance evaluation system of the present technology.

FIG. 4 illustrates one example of a basic report 400 that can be generated by an audit performance evaluation system of the present technology. The basic report 400 includes two sections, a claims service provider comparison section 402, and a performance indicator section 404.

The claims service provider comparison section 402 includes a comparison of the performance of a selected claim administrator 406 to the performance of a plurality of other claim administrators 408. In this example, each other claim administrator is indicated by a generic identifier and the actual identity of the other claim administrators is not displayed. The claims service provider comparison section 402 contains four columns, and each column displays information for each of the claim administrators. The first column is a cumulative rating column 410, which includes an overall cumulative performance score for each claim administrator. The second column is a cumulative possible score column 412, which includes a cumulative possible score for each claim administrator. The third column is a percentage column 410, which displays the percentage performance score for each claim administer received. The fourth column is a rating column 416, which displays an overall performance rating indicator for each claim administrator.

The performance indicator section 404 also includes a comparison of the performance of a selected claim administrator 406 to the performance of a plurality of other claim administrators 408, but using a graph 420. The performance indicator section 404 includes a percentage column 418, which provides the same information as percentage column 410 for each claim administrator. The performance indicator section 404 also includes a graph 420, which can be a bar graph showing the percentage performance score for each claim administrator. The graph 420 can include an industry standard indicator 422, which is shown as being an arrowhead and a line through the bar graph at the point, and which indicates the overall cumulative industry standard level of performance.

Figure 5A:
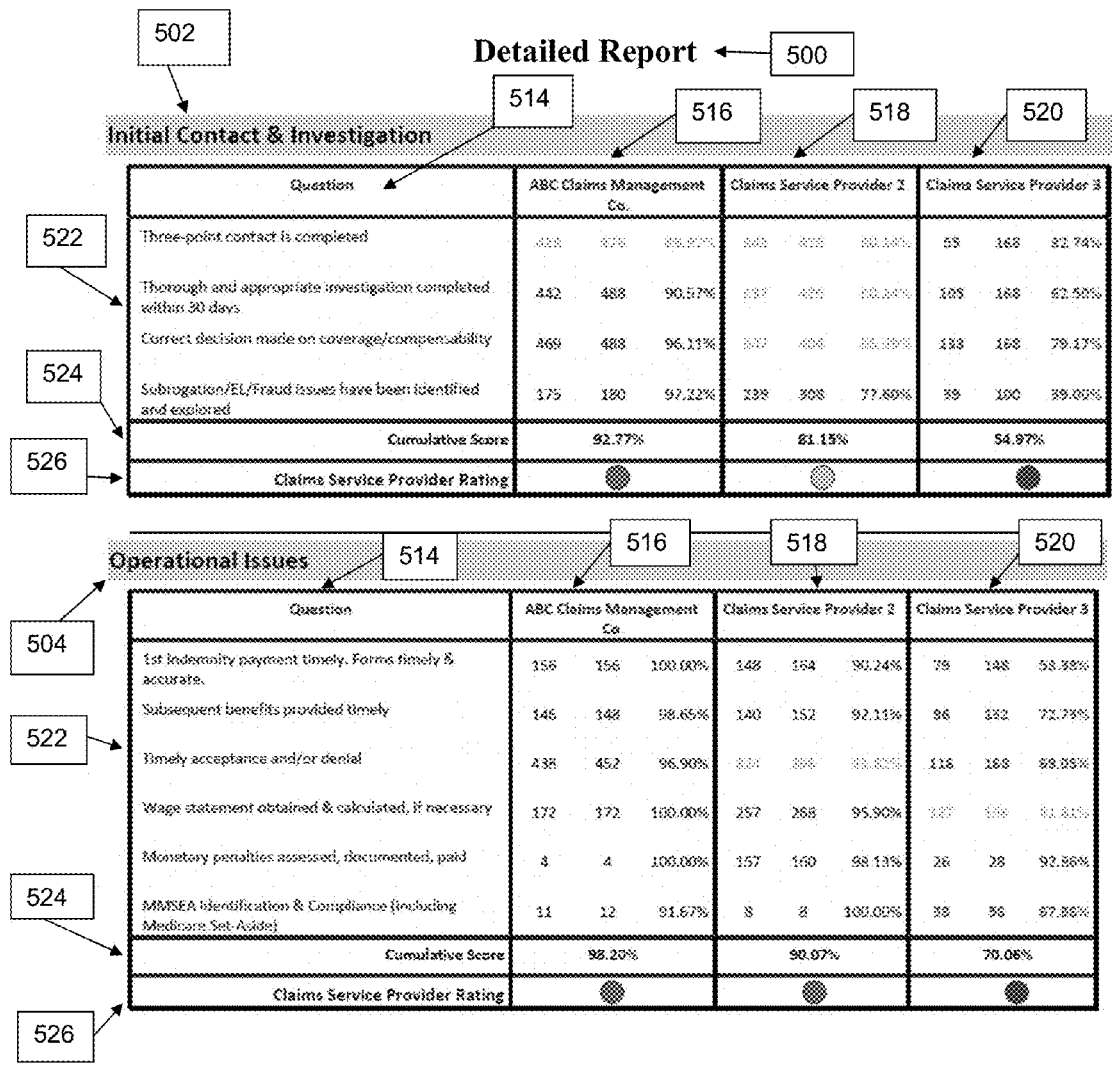
FIG. 5A illustrates a first part of a detailed report that can be generated using an audit performance evaluation system of the present technology.
Figure 5B:
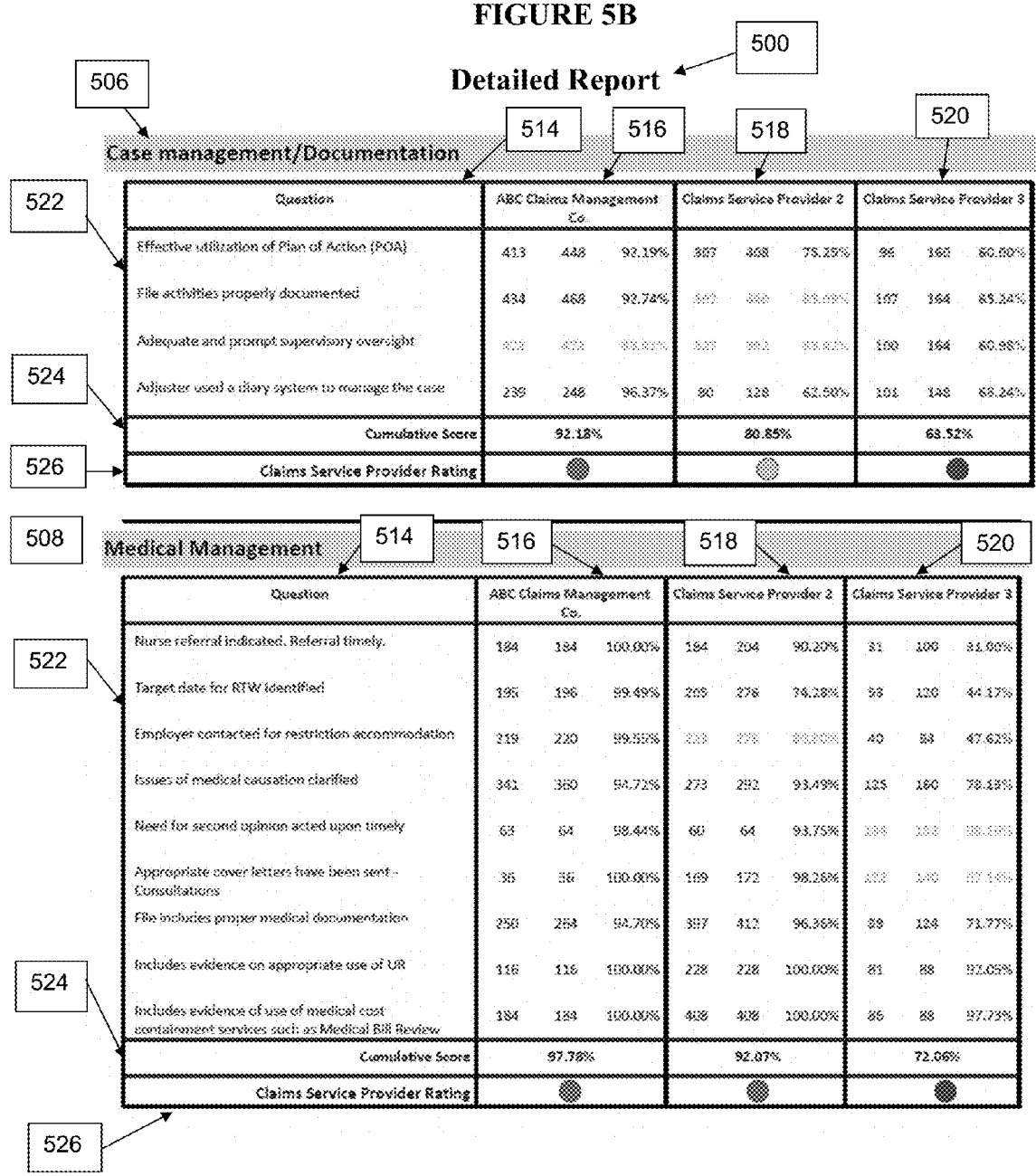
FIG. 5B illustrates a second part of a detailed report that can be generated using an audit performance evaluation system of the present technology.
Figure 5C:
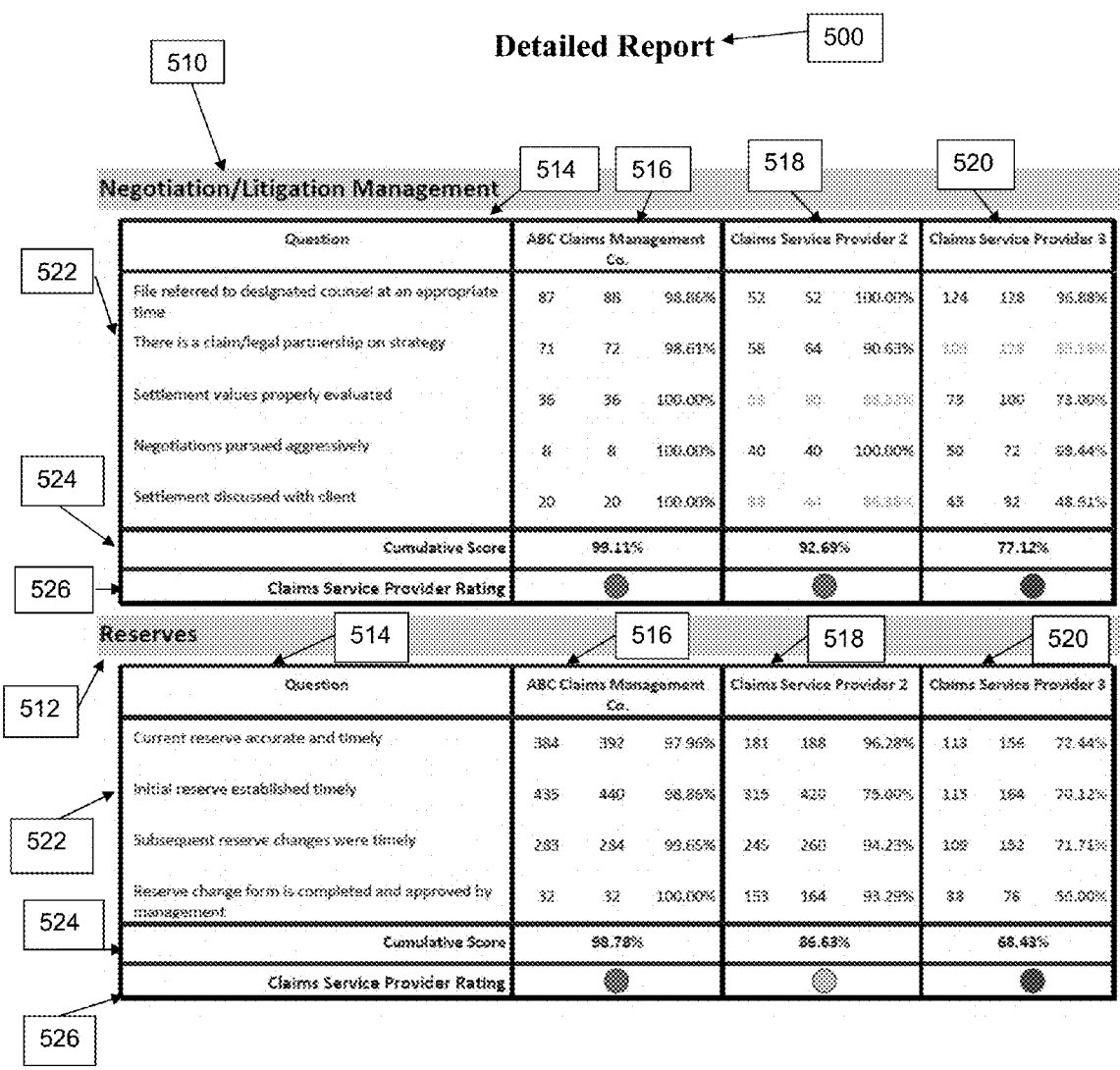
FIG. 5C illustrates a third part of a detailed report that can be generated using an audit performance evaluation system of the present technology.

FIGS. 5A-5C illustrates one example of a detailed report 500 that can be generated by an audit performance evaluation system of the present technology. The detailed report 500 can include a section for each performance category, such as an initial contact and investigation section 502, an operational issues section 504, case management section 506, a medical management section 508, a negotiation/litigation management section 510, and a reserves section 512. Each section can include a table format, having rows and columns. The columns can include a criteria column 514, a selected claim administrator column 516, a first other claim administrator column 518, and a second other claim administrator column 520. The rows can include a criteria row 522 that includes a listing of each criteria within the performance category being displayed in the section in the criteria column 514. The criteria row 522 can also include the performance sore, cumulative possible score, and percentage score for each criteria for the selected claim administrator in selected claim administrator column 516, and for each of the other claim administrators in the other claim administrator columns 518 and 520. A cumulative score row 524 can display a percent score for the performance category for the selected claim administrator in selected claim administrator column 516, and for each of the other claim administrators in the other claim administrator columns 518 and

520. A rating row 526 can display a rating indicator for the selected claim administrator in selected claim administrator column 516, and for each of the other claim administrators in the other claim administrator columns 518 and 520.

Figure 6:
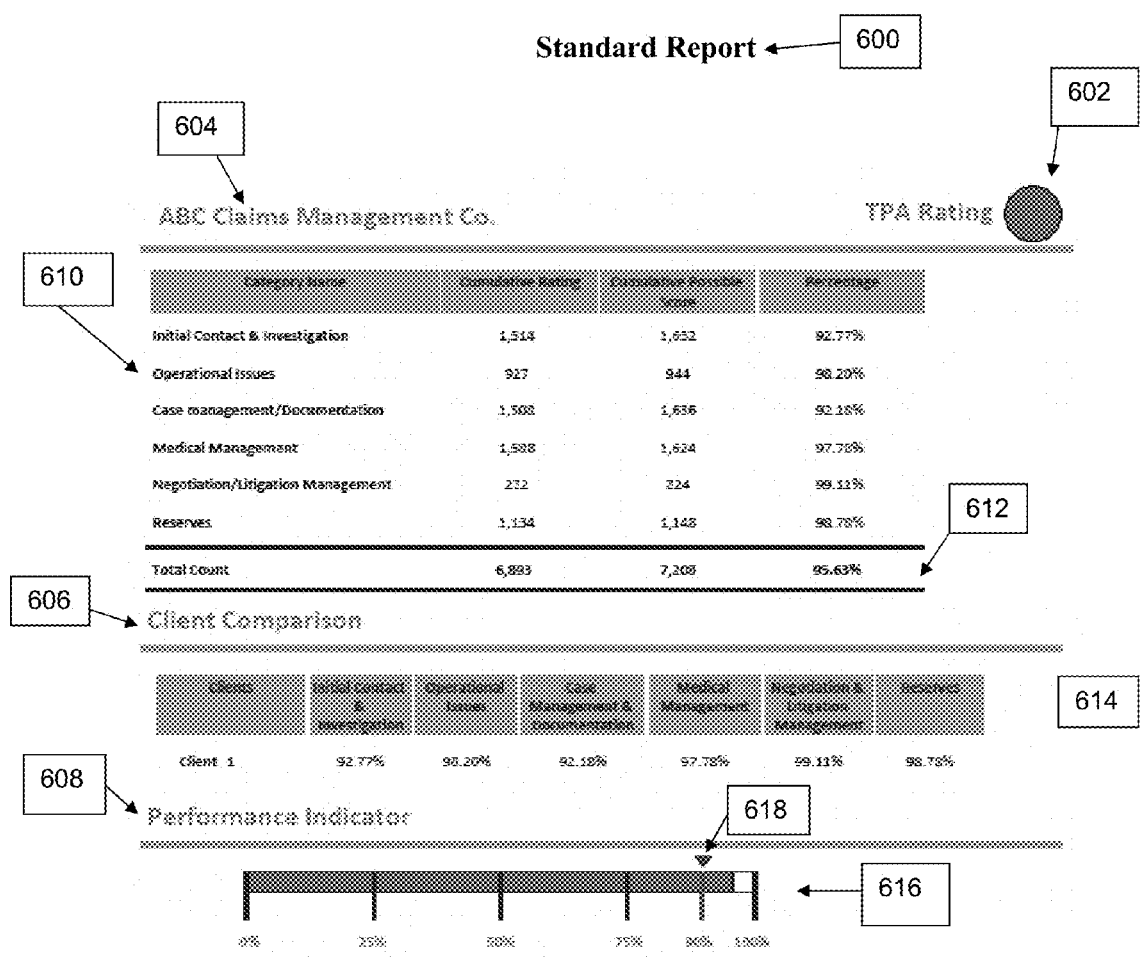
FIG. 6 illustrates one example of a standard report that can be generated using an audit performance evaluation system of the present technology.

FIG. 6 illustrates one example of a standard report 600 that can be generated by an audit performance evaluation system of the present technology. The standard report 600 can include four sections for each claim administrator. A standard report 600 for a selected claim administrator is illustrated, but it should be understood that the report can contain information for other claim administrators as well, in order to allow for comparison of the performance of the selected claim administrator to the performance of other claim administrators. A rating section 602 can include a rating indicator. A claim administrator section 604 can include a performance category table 610 showing the performance sore, cumulative possible score, and percentage score of the claim administrator for each performance category. The performance category table 610 can also include a total count row 612 that includes an overall performance score, and overall cumulative possible score, and an overall percentage score for the claim administrator. A client comparison section 606 can include a client indexed table 614, which can include a percentage score of the claim administrator for each performance category that is indexed by client. A performance indicator section 608 can include a performance graph 616, which can be a bar graph indicating the overall percentage score of the claim administrator, and can also include an industry standard indicator 618 indicating the industry standard overall percentage score.

Figure 7:
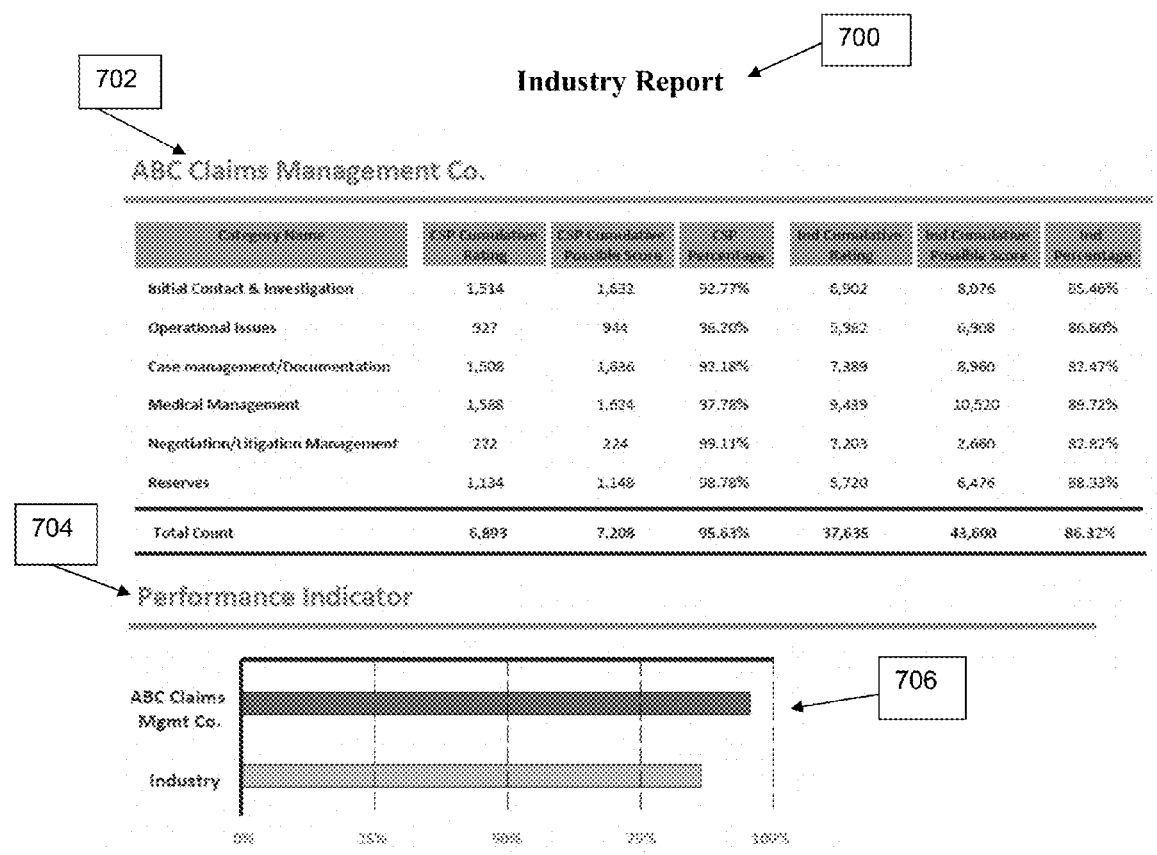
FIG. 7 illustrates one example of an industry report that can be generated using an audit performance evaluation system of the present technology.

FIG. 7 illustrates one example of an industry report 700 that can be generated by an audit performance evaluation system of the present technology. The industry report 700 can include comparisons of the performance of the selected claim administrator to industry standard levels of performance. An industry comparison table 702 can include a comparison for each performance category of the performance sore, cumulative possible score, and percentage score for each of the claim administrator and the industry standard level of performance. The industry comparison table 702 can also include an overall performance score, and overall cumulative possible score, and an overall percentage score for each of the claim administrator and the industry standard level of performance. A performance indicator section 704 can include a performance graph 706, which can be a bar chart comparing the overall percentage score for the claim administrator to the overall percentage score for the industry standard level of performance.

From the foregoing, it will be appreciated that although specific examples have been described herein for purposes of illustration, various modifications may be made without deviating from the spirit or scope of this disclosure. It is therefore intended that the foregoing detailed description be regarded as illustrative rather than limiting, and that it be understood that it is the following claims, including all equivalents, that are intended to particularly point out and distinctly claim the claimed subject matter.

What is claimed is:

1. A system of graphical user interfaces embodied on a non-transitory computer-readable medium and executable on processing circuitry for displaying an objective audit performance evaluation based upon calibrated performance scores, the system comprising:
   a non-transitory computer readable medium storing calibration data, the calibration data comprising a set of calibration levels for each criterion of a plurality of criteria;
   a basic report graphical user interface, comprising
      a claim administrator display region on a user's computing device configured for displaying respective cumulative score information for each performance category of a plurality of performance categories, and
      a comparison display region on the user's computing device configured for displaying client-specific score information beneath a plurality of category headings, wherein each category heading of the plurality of category headings corresponds to a respective performance category of the plurality of performance categories; and
   a detailed report graphical user interface, comprising
      a plurality of performance evaluation display regions on the user's computing device, each performance evaluation display region corresponding to a respective performance category of the plurality of performance categories, wherein each performance evaluation display region is configured for displaying, for each administrator of a plurality of claim administrators, and for each criterion of a subset of the plurality of criteria corresponding to the respective performance category,
         at least one of a performance category score, and a comparison of the performance category score to a performance category benchmark score;
   wherein, upon selection of a particular category heading of the plurality of category headings of the basic report graphical user interface, instructions, executed by the processing circuitry, cause the processing circuitry to prepare, for presentation on the user's computing device, a corresponding performance evaluation display region of the plurality of performance evaluation display regions of the detailed report graphical user interface, wherein preparing the corresponding performance evaluation display region comprises
      analyzing claim audit performance data to determine, for each criterion of the plurality of criteria presented in the corresponding performance evaluation display region, a respective performance benchmark score,
      accessing calibration data associated with each criterion, and
      for each administrator of the plurality of claim administrators, and for each criterion of a portion of the plurality of criteria,
         identifying, in the claim audit performance data, a respective performance score of a respective administrator, and
         determining a respective performance rating indicator corresponding to a calibration level of respective calibration data, and
      present, on the user's computing device, the corresponding performance evaluation display region.

2. The system of claim 1, wherein:
the plurality of performance categories comprises at least three of the following: an initial contact and investigation category, an operational issues category, a case management category, a documentation category, a medical management category, a negotiation management category, a litigation management category, and a reserves category.

3. The system of claim 1, wherein the cumulative score information comprises a) a cumulative score, b) a benchmark score, and c) a comparison of the cumulative score to the benchmark score.

4. The system of claim 3, wherein the benchmark score is one of an industry standard level of performance and a cumulative possible score.

5. The system of claim 1, wherein the client-specific score information comprises, for each client of at least one client and for each performance category of the plurality of performance categories, respective client score information, wherein the respective client score information includes a comparison of a cumulative client-specific score to a client-specific benchmark score.

6. The system of claim 5, wherein the client-specific benchmark score is one of an industry standard level of performance, and a client-specific cumulative possible score.

7. The system of claim 1, wherein the respective performance benchmark score is an industry standard level of performance.

8. The system of claim 1, wherein each performance evaluation display region is configured for displaying, for each administrator of the plurality of claim administrators, and for each criterion of a subset of the plurality of criteria corresponding to the respective performance category, a performance category graphical rating indicator.

9. The system of claim 1, wherein determining the respective performance benchmark score further comprises analyzing claims data.

10. The system of claim 1, wherein the performance rating indicator represents a general indication of level of performance in relation to the respective performance benchmark score and the respective performance score.

11. A non-transitory computer readable medium having instructions stored thereon, wherein the instructions, when executed by processing circuitry, cause the processing circuitry to:
 access, from a non-transitory storage medium, claim audit records including responses to a plurality of claim audit performance questions related to a claim administrator, wherein
  each question of the plurality of claim audit performance questions is associated with a respective category of a plurality of performance categories;
 convert the responses for the plurality of claim audit performance questions into a plurality of performance scores, each score of the plurality of performance scores having the respective category of the plurality of performance categories of the corresponding claim audit performance question;
 access calibration data comprising a set of calibration scales, including a respective calibration scale for each category of the plurality of performance categories;
 for each performance score of the plurality of performance scores, determine a respective performance rating indicator corresponding to a calibration scale of the respective performance category; and
 cause presentation, for a user of a remote computing device via a network, of a graphical user interface for at least one of the plurality of performance categories to a remote computing device, wherein the graphical user interface includes one or more interface sections configured to display audit performance indications including performance rating indicators for the claim administrator relative to each of a plurality of claim performance metrics.

12. The non-transitory computer readable medium of claim 11, wherein the one or more interface sections include at least one of a) a first interface section configured to present the audit performance indications within a tabular format, b) a second interface section configured to present the audit performance indications within a tiered graphical display indicating one or more audit performance levels of a respective calibration scale of the sets of calibration scales, and c) a third interface section configured to present the audit performance indications within a bar graph representation.

13. The non-transitory computer readable medium of claim 11, wherein the audit performance indications include at least one of a cumulative performance score for each of the plurality of performance categories, a respective claim performance metric of the plurality of claim performance metrics associated with each of the plurality of claim audit performance questions, and a cumulative performance metric for each of the plurality of performance categories.

14. The non-transitory computer readable medium of claim 11, wherein the instructions, when executed on the processing circuitry, cause the processing circuitry to, prior to converting the responses, receive the claim audit records from the remote computing device via the network.

15. The non-transitory computer readable medium of claim 11, wherein the claim audit records are associated with identification information for the claim administrator including at least one of an insurance carrier and an industry market segment.

16. The non-transitory computer readable medium of claim 15, wherein the instructions, when executed by the processing circuitry, further cause the processing circuitry to, prior to accessing the claim audit records, index the claim audit records into the one or more categorical groupings based on the identification information for the claim administrator.

17. The non-transitory computer readable medium of claim 11, wherein the instructions, when executed by the processing circuitry, further cause the processing circuitry to calculate, from the claim records, respective one or more claim performance metrics of the plurality of claim performance metrics for each of the plurality of claim audit performance questions, wherein the respective one or more claim performance metrics include minimum acceptable scores for each of the plurality of claim audit performance questions.

18. The non-transitory computer readable medium of claim 17, wherein the instructions, when executed on the processing circuitry, further cause the processing circuitry to calculate, from the respective one or more performance metrics associated with each of the plurality of claim audit performance questions, cumulative performance metrics for each category of the plurality of performance categories.

19. The non-transitory computer readable medium of claim 11, wherein converting the responses for each of the plurality of claim audit performance questions into the performance scores further includes calculating percentage performance scores using the calibration data based on a respective total possible score associated with each of the plurality of claim audit performance questions.

20. The non-transitory computer readable medium of claim 11, wherein causing presentation of the graphical user interface with the one or more interface sections includes displaying audit performance indications for a plurality of claim administrators including the claim administrator at each of the one or more interface sections.

* * * * *